Patented July 12, 1938

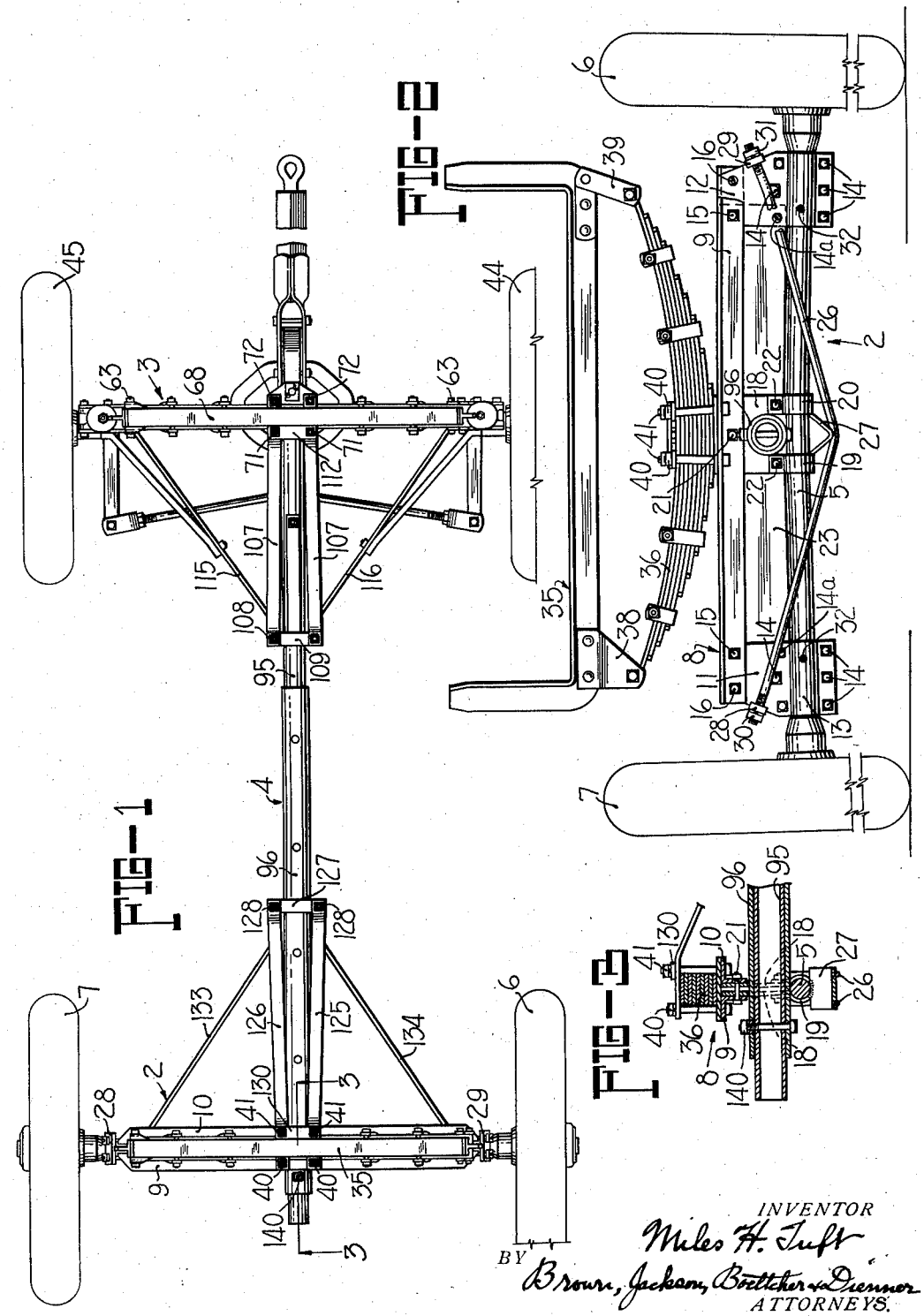

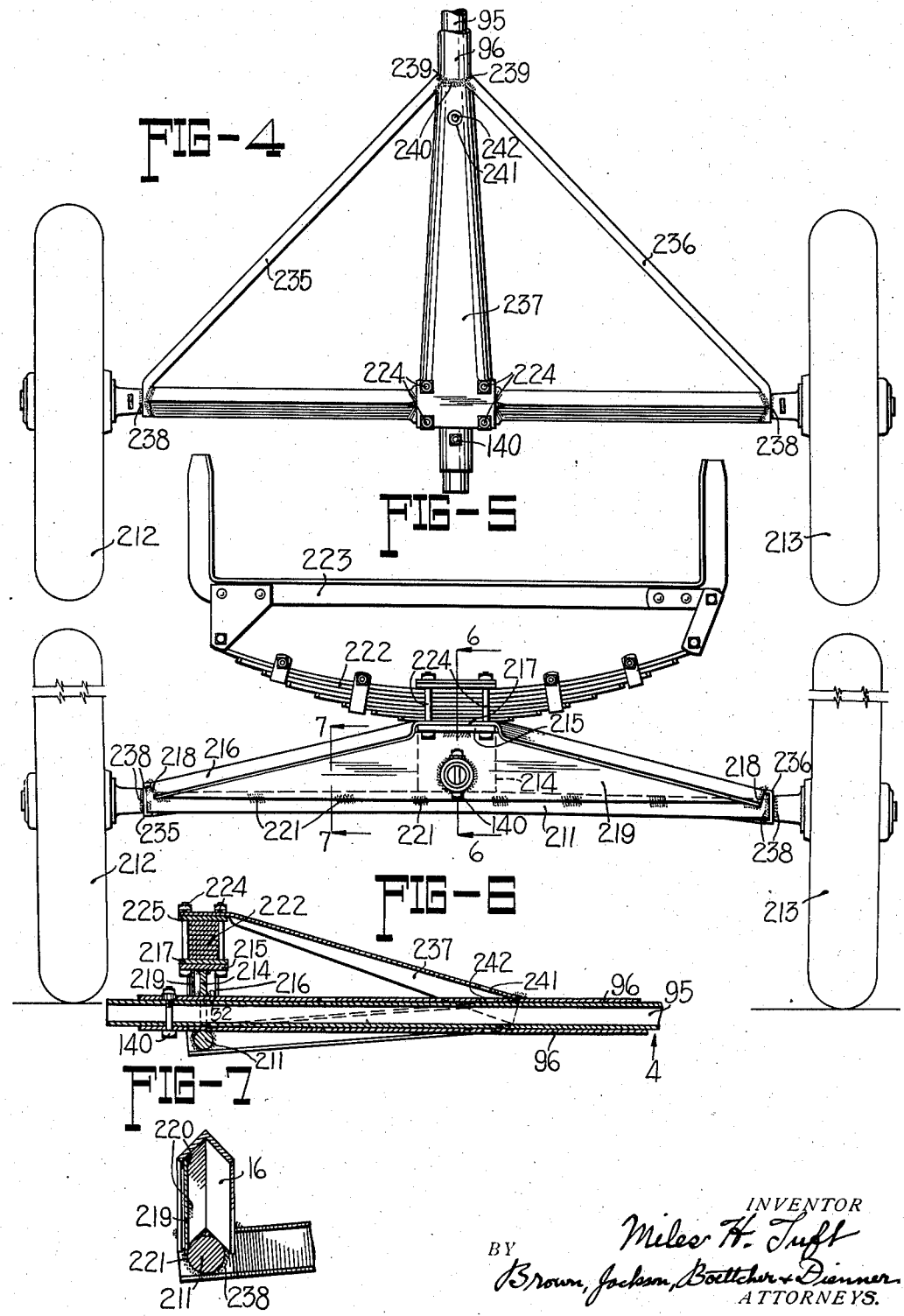

2,123,456

UNITED STATES PATENT OFFICE 2,123,456

WHEELED VEHICLE

Miles H. Tuft, Rock Island, Ill., assignor to Deere & Company, Moline, Ill., a corporation of Illinois Application February 9, 1935, Serial No. 5,724

22 Claims. (Cl. 29—84)

This application is a continuation in part of my copending application, Serial No. 730,758, filed June 15, 1934, Patent No. 2,059,419.

The present invention relates generally to wheeled vehicles and the like, and particularly to running gears for wheeled vehicles such as trailers, wagons and similar vehicles, and the principal object of the present invention resides in certain new and improved construction of the rear gear. Specifically, it is the object of the present invention to provide a rear gear which comprises an axle and a generally rigid member connected therewith at the ends of the axle, with parts so constructed and arranged that during assembly the axle may be deflected a limited amount so as to give the rear wheels, journaled for rotation on the ends of the axle, the required pitch. Specifically, it is the object of the present invention to obtain the proper relative angle between the two ends of the axle to provide the proper pitch for the wheels by bending the axle in the assembly of the gear, the axle being held in such position by its connection with the other parts of the gear.

Heretofore, it has always been customary to bend the axle before assembling the gear, that is, to give the axle a permanent set to proper shape without depending on the connections of the other parts of the gear with the axle to hold the axle in such shape. Preferably, although not necessarily, the rigid member is disposed in substantial parallelism with respect to the axle itself. The present invention also contemplates permanently and rigidly connecting the brackets to the rigid member and to the axle after the latter has been deflected the desired amount to give the rear wheels the proper positioning.

A further object of the present invention is to provide brackets which are, at least during assembly, pivotally connected with the rigid member but which are connected with the axle in such a way that angular displacement between the brackets and the axle is not permitted, in connection with means for swinging the brackets with respect to their pivotal connection with the rigid member so as to deflect the outer ends of the axle for the purpose of giving the rear wheels the required pitch.

In another aspect of this feature of the present invention it is an object thereof to provide suitable tensioning means arranged to react against the ends and the intermediate portion of the axle so as to be capable of deflecting or bending the axle to give the end portions thereof the proper angle to provide the desired pitch for the wheels journaled on the axle ends.

A further important object of the present invention is the provision of a new and improved axle or gear in which the axle is held bent in a jig or other suitable means while the other parts of the gear are being firmly secured thereto, as by welding or the like. Thereafter, that portion of the gear may be removed from the jig but, due to the secure attachment of the associated parts, the axle will be held in its bent position, with the ends thereof at a slight angle relative to each other for the purpose of giving the wheels their desired pitch.

These and other objects and advantages of the present invention will be apparent to those skilled in the art after a consideration of the following detailed description of the preferred construction, taken in conjunction with the accompanying drawings forming a part of this specification.

In the drawings:

Figure 1 is a top plan view of the running gear or chassis of a vehicle embodying the principles of the present invention;

Figure 2 is a rear view, looking forwardly, of the vehicle illustrated in Figure 1;

Figure 3 is a view taken along the section line 3—3 of Figure 1 and looking in the direction of the arrows;

Figure 4 is a top plan view of the rear portion of a vehicle running gear or chassis, embodying certain modifications;

Figure 5 is a rear view, looking forwardly, of the construction shown in Figure 4;

Figure 6 is a longitudinal vertical section taken along the line 6—6 of Figure 5; and Figure 7 is a similar section taken along the line 7—7 of Figure 5.

Referring now to the drawings, the wheeled vehicle with which the present invention is concerned has been illustrated as in the form of a trailer or wagon which comprises a running gear having a rear truck or gear 2 and a front truck or gear 3 connected together by a telescopic reach pole construction indicated in its entirety by the reference numeral 4.

Referring first to the rear gear 2, best shown in Figures 2 and 3, it will be seen that this part comprises an axle 5 on the outer ends of which there are rear supporting wheels 6 and 7 journaled by any suitable form of bearing means. Disposed above the axle 5 but parallel with respect thereto is a rigid member 8 which is formed of preferably two angle irons 9 and 10, as best shown in Figure 3. The member 8 is disposed an appreciable distance above the axle 5 but has its ends connected with the shaft 5 by suitable bracket means 11 and 12. Each bracket means is made up of a pair of plates, each of which has a semi-cylindrical recess formed in the lower end thereof, the two recesses of each pair forming a cylindrical opening for receiving the axle 5. The plates of each pair are rigidly bolted together and clamped around the axle 5 by means of a plurality of bolts 14 and a bolt 14a which passes through a reenforcing or filler plate that will be referred to later. At their upper ends the plates forming the brackets 11 and 12 are bolted to the angle members 9 and 10 by means of bolts 15 and 16, these bolts also serving to secure the two angle members 9 and 10 rigidly together at their ends.

At its central portion, the axle 5 is connected to the angles 9 and 10 by a pair of plates 18 which are disposed between the vertical legs of the angles 9 and 10, as best shown in Figure 3, and rigidly connected therewith by means of a bolt 21. A pair of straps 19 and 20 embrace the shaft 5 and are securely bolted to the lower ends of the plates 18 by means of bolts 22 or the like. A filler plate 23 is disposed between the rigid member 8, comprising the angles 9 and 10, and the axle 5, and the filler plate 23 is positioned with its outer ends between the plates forming the brackets 11 and 12, and extends between the plates 18. As best shown in Figure 2, the outer portions of the filler plate 23 extend laterally outwardly as far as the bolts 14a and 15. The filler plate 23 improves the appearance of the rear axle and, at the same time, provides additional rigidity to the rear gear.

The rear gear 2 is braced by truss means which not only strengthens the axle but at the same time provides for adjusting the pitch of the rear wheels 6 and 7. The truss means consist of a pair of truss rods 26, one disposed on each side of the axle 5, and these rods bear against an abutment member 27 disposed in the center of the axle 5. Preferably, the abutment 27 is in the form of a triangular piece welded to the inner sides of the straps 19 and 20, but if desired the abutment 27 may be welded to the axle or may be formed as an integral part of one or both of the straps 19 and 20. The truss rods 26 extends outwardly and upwardly from the abutment block 27 and have their ends extending through perforations in brackets 28 and 29 which rest in recesses provided for them in the outer edges of the plates forming the vertical brackets 11 and 12. The ends of the truss rods 26 are threaded and provided with adjusting nuts 30 and 31 by which the truss rods may be tensioned. When the nuts 30 and 31 are tightened the truss rods 26 react against the brackets and bear upwardly against the central portion of the axle 5, thus strengthening the rear gear.

The truss rods 26 also serve as means for giving the rear wheels 6 and 7 the proper pitch, although in the arrangement shown whenever the truss rods 26 are tightened, the central portion of the rear axle 5 is deflected upwardly so that the mere act of tightening the truss rods increases the pitch of the rear wheels slightly. However, in the process of assembling the rear gear, the parts are connected as described above, but the bolts passing through the plates forming the brackets 11 and 12 are left loose. The holes in the bracket plates 11 and 12 for the bolts 14a and 16 are purposely made somewhat larger than the diameter of the bolts so that there is some permissive pivoting of the brackets 11 and 12 about the inner bolts 15 whenever the nuts 30 and 31 on the truss rods 26 are tightened. Thus, as will be clear from Figure 2, tightening the truss rods 26 causes the bracket 11 to swing slightly in a counterclockwise direction and the other bracket 12 to swing in a clockwise direction. This angular movement of the brackets 11 and 12 causes the lower portions thereof, that is, the portions which embrace the axle 5, to shift inwardly a slight amount on the axle 5, but by virtue of the lower portions 13 of the plates being formed to snugly embrace the axle 5, the outer ends of the axle are deflected downwardly when the brackets 11 and 12 are pivoted in the manner mentioned. Whenever the nuts 30 and 31 have been tightened enough to give the rear wheels 6 and 7 the proper pitch, the bolts 14, 14a, 15 and 16 are then firmly tightened and, in addition, the plates forming the brackets 11 and 12 are rigidly fixed to the axle 5, preferably by welding the plates thereto through holes 32 provided for that purpose.

Even though the rear wheels 6 and 7 are thus given the desired or proper pitch during assembly by first having the brackets loosely engage the axle and pivoting the brackets about the inner bolts 15, as provided for by the above described construction, after the brackets are firmly secured to the axle 5 as by tightening the bolts and by welding, as described, it is also possible to further adjust the pitch of the rear wheels at any time by tightening or loosening the nuts 30 and 31. For example, tightening the nuts 30 and 31, even after the brackets 11 and 12 are rigidly secured in place, will cause the axle 5, as well as the angle members 9 and 10, to bend upwardly.

A bolster 35 is provided for supporting the bed or body of the trailer and is preferably formed of a single piece of T-bar stock. The bolster 35 is supported on a transversely disposed semi-elliptic spring 36, one end of which is fixed to a pair of brackets 38 carried by the bolster, and the other end of the spring 36 is connected to the other end of the bolster by means of a swinging shackle 39. The central portion of the spring 36 is bolted to the top of the axle member 8 by means of bolts 40 and 41 disposed on opposite sides of the spring and passing through holes in the flanges of the angle members 9 and 10. The upper threaded ends of the bolts 40 and 41 pass through the rear ends of straps which will be referred to later but which are such that when the bolts are tightened the central section of a spring 36 is rigidly fastened to the angle members 9 and 10 forming the member 8.

The front gear 3, best shown and claimed in my aforesaid application, of which this is a continuation in part, comprises a transverse beam which is preferably formed of plow beam stock and is supported at its outer ends on a pair of dirigible wheels 44 and 45. Each of the front dirigible wheels is connected with the associated end of the front axle beam by a shaft and spindle assembly. A bolster 68, similar to bolster 35 for the rear gear 12, has been provided for the front gear 3 and is supported in a similar manner on a transversely disposed leaf spring which rests upon and is bolted to the front gear 3 in a manner similar to the way in which the rear bolster is mounted, as shown in Figure 2.

The reach pole construction 4 which connects the front and rear running gears together comprises two telescopically associated reach pole sections 95 and 96. Preferably these sections are of tubular pipe stock, and the outer diameter of the section 95 is slightly smaller than the inner diameter of the rear section 96 to provide for the telescopic association mentioned in my copending application, Serial No. 730,758 referred to above.

The section 95, hereinafter referred to as the forward section because it is connected with the front gear, is fixed at its front end to the forward gear 3 and is braced to the front gear 3 by means of a pair of upwardly and forwardly extending braces 107 secured, as by bolts 108, to a short transverse top plate 109. A U-shaped strap embraces the reach pole section 95 and has its upper ends secured in place by the bolts 108. The forward ends of the braces 107 are bolted to the top of the front spring by means of the bolts 71 and 72, the forwardmost ends of the braces 107 having apertures to receive these bolts so that when they are tightened both the braces 107 and the spring are securely fastened to the front gear 3. In addition, a spacer 112 is associated with the rear bolts 71 and serves to hold the braces 107 in proper position. The forward pole section 95 is further braced to the front gear 3 by means of forwardly and laterally outwardly extending braces 115 and 116 which are connected at their forward ends to bolts 63 at the ends of the front axle beam. At their inner ends the braces 115 and 116 are welded, as best shown in Figure 3, to the U-shaped strap which is bolted to the bar 109 mentioned above.

The rear reach pole section 96 is fixedly connected to the rear running gear 2 by a construction somewhat similar to that described above for the front gear 3, the details per se of which do not form any part of the present invention. The rear end of the rear pole section 96 extends through perforations in the plates 18, as best shown in Figure 3, and preferably the rear pole section 96 is welded to these plates. The rear reach pole section is braced by a pair of upwardly and rearwardly extending braces 125 and 126 which are fixed at their forward ends to a short transverse bar 127, as by bolt means 128, which is also utilized to secure thereto the ends of a U-shaped member which embraces the rear reach pole section 96 and is otherwise positioned in a manner similar to the U-shaped bracket associated with the forward bracing structure. At their rear ends the braces 125 and 126 are connected to the top of the rear spring 36 by the bolts 40 and 41, the rear sections of the braces 125 and 126 receiving both of these bolts as best shown in Figure 8. A spacer 130 is associated with the bolts 41. The rear pole section 96 is further braced by means of a pair of braces 133 and 134, welded at their forward ends to the U-shaped bracket embracing the reach pole section 96 and secured in place by the bolts 128, and the rear ends of the diagonal braces 133 and 134 are connected to the upper bracket bolts 14 extending through the pairs of plates 11 and 12. The tubular reach pole sections 95 and 96 are connected together at their rear ends by means of a bolt 140, or the equivalent, which is disposed in aligned perforations in the reach pole sections. The section 96 is provided with additional openings in which the bolt 140 may be disposed to lengthen the wheel base of the trailer.

Thus I have provided a vehicle or trailer which is at once simple and sturdy and which embodies an improved rear gear of such construction that the rear axle can be brought, during assembly, to the proper form or angularity and held in that position to permit the attachment of other of the rear gear parts which, when the attachment is completed, serve to retain the proper shape or position of the axle without the necessity of giving a permanent set to the axle.

Figures 4 to 7 show a modified form of the present invention in which the rear gear includes an axle, indicated by the reference numeral 211, on the outer ends of which wheels 212 and 213 are journaled. A vertically disposed plate 214 is welded to the center portion of axle 211 and has another horizontally disposed plate 215 welded along its top edge. An angle member 216 has its two flanges bent outwardly at the center portion to provide a flat portion 217 which rests on top of the plate 215, the plates 214 and 215 serving as a reenforcing bracket connecting the flat portion 217 to the axle 211. The portions of member 216 on each side of the center portion are bent downwardly and the ends thereof are welded to the axle 211, as indicated at 218. A filler 219 in the form of a piece of sheet metal is disposed between the angle member 216 and the axle 211, being welded at a plurality of points to both the angle member and the axle, as shown at 220 and 221.

A leaf spring assembly 222, carrying a bolster 223, is mounted on top of the flat portion 217 of the angle member 216 and is bolted to it by means of bolts 224 which pass through holes in a plate 225 resting on top of the spring assembly and through holes in the flat portion 217 and in the plate 215. The rear section 96 of the reach pole extends through openings provided in the plate 214 and the filler member 219, being welded to both of these members as shown at 32 (Figure 6). The section 96 of the reach pole 4 is braced to the rear gear by means of braces 235, 236 and 237. The braces 235 and 236 are of channel formation and the rear ends thereof are perforated to receive the axle 211 and are welded thereto as shown at 238. The forward ends of the members 235 and 236 are welded to the reach pole section 96 as shown at 239. The brace 237 is preferably formed of a rectangular piece of relatively heavy sheet metal, and the rear portion thereof is bolted to the top of the plate 225 by means of the bolts 224. From its rear portion, the sides of the brace 237 are curved downwardly and the forward portions thereof are disposed in contact with the periphery of the rear reach pole section 96, the forward end of the brace being welded to the reach pole section, as shown at 240. A hole 241 is provided in the brace 237 in line with a hole 242 in the reach pole section 96, to facilitate placing a bolt in the latter hole whenever that is done to lengthen out the truck.

In the assembly of this rear gear, the axle 211 is placed in a jig which is provided with means for bending the axle to place the ends thereof at a slight angle relative to each other for the purpose of giving the wheels 212 and 213 their desired pitch. With the axle 211 held in this bent position, the plate 214 and the angle iron 216 are welded thereto, and then the filler plate 219 is welded in place. Thereafter, that portion of the gear may be removed from the jig but, due to the secure attachment of the associated parts, the axle 211 will be held in its bent position.

While I have shown and described above the preferred forms of my invention, it will be apparent to those skilled in the art that the present invention is not to be limited to the particular details shown and described above, but that, in fact, widely different means may be employed in the practice of the broader aspects of my invention.

What I claim, therefore, and desire to secure by Letters Patent is:

1. The method of fabricating a wheel supported axle structure embodying a rigid member having an axle, on the ends of which the supporting wheels are journaled, connected to the ends of said member, which method comprises deflecting the axle within its elastic limit to give the proper pitch to said wheels, holding the axle deflected, permanently and securely connecting the ends of said rigid member with the end portions of said axle, and permanently connecting the intermediate portion of the axle in its deflected position to the central portion of the rigid member so as to hold the axle in its deflected position.

2. The method of obtaining the proper relative angle between the two ends of an axle of a vehicle gear, which method comprises holding the axle bent to the desired angularity, and then welding other gear parts to the end and intermediate portion of said axle while held in said position, whereby said gear parts serve to prevent the return of said axle to the position it occupied before being bent during assembly.

3. The method of fabricating a wheel supported axle structure embodying a rigid member having an axle, on the ends of which the supporting wheels are journaled, connected thereto by brackets near the ends of said member, which method comprises shifting said brackets relative to said member and axle so as to bend the axle within its elastic limits and secure the angularity desired, and then permanently and rigidly connecting the brackets to the axle and the rigid member while the axle is held in its bent position.

4. The method of fabricating a wheel supported axle structure embodying a rigid member having an axle, on the ends of which the supporting wheels are journaled, connected thereto by brackets near the ends of said member, which method comprises temporarily attaching said brackets to said member for limited pivotal movement, securing the ends of the brackets to the axle against relative angular displacement, swinging the brackets about their pivots on the rigid member and deflecting the axle to give the proper pitch to said wheels, and then permanently and rigidly connecting the brackets to the axle and the rigid member.

5. A gear for a wheeled vehicle comprising an axle, and a rigid member disposed generally longitudinally thereof and securely fastened at its central portion and at its ends to said axle against relative angular displacement with the latter bent to a given relative angularity within its elastic limits, the rigidity of said member and its secure attachment at its ends to said axle serving to retain said angularity.

6. A gear for a wheeled vehicle comprising an axle, a rigid member disposed generally longitudinally thereof, bracket means fixed to opposite ends of said rigid member and said axle against relative angular displacement, and separate bracket means disposed between and spacing the intermediate portion of said member from the intermediate portion of said axle, the rigidity of said member and the secure attachment of said two bracket means to said member and said axle against relative angular displacement serving to retain the latter in position.

7. A gear for a wheeled vehicle comprising an axle, a rigid member disposed generally longitudinally thereof, a pair of brackets rigidly connecting the ends of said member with the ends of said axle, with the latter bent to a predetermined angularity within the elastic limit of the axle, and means acting against said brackets and axle to retain the latter in said angular position.

8. A gear for a wheeled vehicle comprising an axle, a rigid member disposed generally longitudinally thereof, bracket means disposed between and spacing the intermediate portion of said member from the intermediate portion of said axle, bracket means rigidly securing the ends of said member directly to the end portions of said axle, with the latter bent to a predetermined angularity within the elastic limit of the axle, and means acting against said second mentioned bracket means and cooperating with said first mentioned bracket means and said axle to retain the latter in said angular position.

9. A gear for a wheeled vehicle comprising an axle, wheels journaled on the ends of said axle, a rigid member comprising an angle member having a flattened intermediate section spaced from said axle and downwardly and laterally disposed angle sections with ends rigidly connected with the ends of said axle, means serving as a bracket rigidly connecting the flattened intermediate portion of said angle member with said axle, and means securely fastening said rigid member, bracket means and axle together with the latter bent to a predetermined angularity within the elastic limit of the axle, whereby the rigidity of said member, its spacing from the axle and the secure attachment of said member, bracket means and axle serve to retain the latter in said angular position to give proper pitch to said wheels.

10. A gear for a wheeled vehicle comprising an axle, wheels journaled on the ends of said axle, an angle member having a flattened central section terminating laterally outwardly in angled sections with their ends rigidly secured to the end portions of said axle, and a central bracket disposed between said flattened section and the central portion of said axle and rigidly secured thereto.

11. A gear for a wheeled vehicle comprising an axle, wheels journaled on the ends of said axle, an angle member having a flattened central section terminating laterally outwardly in angled sections with their ends rigidly secured to the end portions of said axle, bracket means comprising a vertically disposed portion rigidly connected with the axle and a transverse plate portion disposed against the flattened section of said angle member, and spring means mounted on and securely clamped to said plate portion and said flattened angle section.

12. A gear for a wheeled vehicle comprising an axle, a rigid angle member disposed generally longitudinally of the axle and securely fastened thereto at its ends, said rigid angle member having a flattened central section spaced from said axle, bracket means connecting said flattened section with said axle to reinforce the latter, a central brace member comprising a channel-like member having one end flattened, and bolster carrying means rigidly fastened between said flattened portions.

13. A gear for a wheeled vehicle comprising an axle, a supporting wheel on each end of said axle, a reinforcing member disposed parallel to but spaced from said axle and carrying means at its ends engaging the axle at spaced points, and adjustable means connected with said member adjacent its ends at points above the axle and reacting on the under side and against the intermediate portion of the latter between said spaced points to deflect the ends of said axle to adjust the pitch of said wheels.

14. A gear for a wheeled vehicle comprising an axle, a supporting wheel on each end of said axle, a rigid member disposed parallel to said axle, a pair of brackets pivoted to opposite ends of said member and engaging the ends of said axle, and means reacting against said brackets and the intermediate portion of the axle for deflecting the ends of said axle to adjust the pitch of said wheels.

15. A gear for a wheeled vehicle comprising an axle, a supporting wheel on each end of said axle, a rigid member disposed parallel to said axle, a pair of brackets pivoted to opposite ends of said member and engaging the ends of said axle, and truss rod means connected at its ends with said brackets and operative when tightened to pivot said brackets slightly with respect to the rigid member to deflect the ends of the axle for adjusting the pitch of the wheels.

16. A gear for a wheeled vehicle comprising an axle, a supporting wheel on each end of said axle, a rigid member disposed parallel to said axle, a pair of brackets pivoted to opposite ends of said member and engaging the ends of said axle, and a pair of truss rods, one on each side of said axle, adjustably anchored to said brackets and reacting against the lower intermediate portion of said axle and operative when tightened to swing said brackets slightly with respect to the rigid member to deflect the ends of the axle for adjusting the pitch of the wheels.

17. A gear for a wheeled vehicle comprising an axle, a supporting wheel on each end of said axle, a rigid member disposed parallel to said axle, a pair of brackets pivoted to opposite ends of said member and engaging the ends of said axle, and means for swinging said brackets relative to said member to deflect the ends of said axle to adjust the pitch of said wheels.

18. A gear for a wheeled vehicle comprising an axle, a supporting wheel on each end of said axle, a rigid member disposed parallel to said axle, a pair of brackets pivoted to opposite ends of said member and engaging the ends of said axle, an abutment on said axle on the side opposite said member intermediate the ends of the axle, and an adjustable tension member bearing against said abutment and connected at its ends to said brackets for swinging said brackets relative to said member and for exerting a bending stress upon said axle to deflect said axle to adjust the pitch of said wheels.

19. A gear for a wheeled vehicle comprising an axle, a supporting wheel on each end of said axle, a rigid member disposed parallel to said axle, a pair of brackets pivoted to opposite ends of said member and having lower portions formed to snugly embrace the axle, and holding the brackets and axle against relative angular movement, and means for swinging said brackets relative to said member to deflect the ends of said axle to adjust the pitch of said wheels.

20. A gear for a wheeled vehicle comprising an axle, a supporting wheel on each end of said axle, a rigid member disposed parallel to said axle, a pair of brackets pivoted to opposite ends of said member and engaging the ends of said axle, bracket means connecting the central portions of said member and axle together, and adjustable tensioning means reacting through the central portion of said axle against said bracket means and connected at its ends to said brackets for swinging said brackets relative to said member to deflect the ends of said axle to adjust the pitch of said wheels.

21. The method of fabricating a wheel supported axle structure embodying a rigid member having an axle, on the end of which the supporting wheels are journaled, connected thereto near the ends of said member, which method comprises bringing said axle into approximate position relative to said rigid member, deflecting the axle within its elastic limit to give the proper pitch to said wheels, and then fastening the end and intermediate portions of said rigid member to the axle to prevent the axle from springing back into its original position.

22. The method of fabricating a wheel supported axle structure embodying a rigid member having an axle, on the ends of which the supporting wheels are journaled, connected thereto near the ends of said member, which method comprises bringing said axle into approximate position relative to said rigid member, deflecting the axle within its elastic limit to give the proper pitch to said wheels, permanently connecting the ends of said rigid member, as by welding, to said axle while the latter is held in its deflected position, and connecting the intermediate portion of said rigid member to the intermediate portion of said axle while the latter is deflected.

MILES H. TUFT.